(12) United States Patent
Saeed et al.

(10) Patent No.: US 7,006,491 B2
(45) Date of Patent: Feb. 28, 2006

(54) METHOD AND SYSTEM FOR SERVICE INTEGRATION IN A MULTI-SERVICE COMMUNICATION SYSTEM

(75) Inventors: Faisal Saeed, Sunrise, FL (US); Deepak P. Ahya, Plantation, FL (US); Sanigepalli V. Praveenkumar, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/835,648

(22) Filed: Apr. 30, 2004

(65) Prior Publication Data

US 2005/0243754 A1   Nov. 3, 2005

(51) Int. Cl.
*H04L 12/66* (2006.01)
(52) U.S. Cl. .................. 370/352; 455/415; 455/521
(58) Field of Classification Search ........ 370/352–356, 370/310, 328; 455/415, 422.1, 403, 404.1, 455/518, 521, 510
See application file for complete search history.

(56) References Cited

U.S. PATENT DOCUMENTS 5,548,631 A * 8/1996 Krebs et al. ............. 455/426.1
6,138,030 A * 10/2000 Coombes et al. ........... 455/507
6,408,177 B1 * 6/2002 Parikh et al. ............. 455/414.4
6,496,578 B1 * 12/2002 Chen et al. ............ 379/211.02
6,650,908 B1 * 11/2003 Coombes et al. ........... 455/560

OTHER PUBLICATIONS

Audiovox, "CDM8300AT Tri Mode CDMA2000 1X Digital Wire Handset," hhttp://www.audiovox.com/webapp/wcs/stores/servlet/ProductDisplay?catalogID=10001&1st..., Apr. 30, 2004.

* cited by examiner

*Primary Examiner*—Ajit Patel (57) ABSTRACT

A method (500), communication system (10) and portable communication unit (31, 32, 33) capable of integrating a plurality of communication services can include a transceiver and a processor (34) coupled to the transceiver. The processor coupled to the transceiver can be programmed to receive (508) at least one request among a dispatch call request, an interconnect call request, and a packet data session request while the portable communication unit is in an active session with at least one among an existing dispatch call, an existing interconnect call, and an existing packet data session, provide notification (512) of the at least one request while in the active session, and enable a selection (514) among a rejection of the at least one request, an acceptance of the at least one request, and a message response to the at least one request.

16 Claims, 7 Drawing Sheets

Table 1: Dispatch Call Interrupt for Dispatch call

| Bit Number | | | | | | | | Octet Number |
|---|---|---|---|---|---|---|---|---|
| 8 | 7 | 6 | 5 | 4 | 3 | 2 | 1 | |
| Transaction Identifier | | | | Protocol Discriminator | | | | 1 |
| Message Type | | | | | | | | 2 |
| Individual ID IE | | | | | | | | 3 |
| Individual ID | | | | | | | | 4 |
| | | | | | | | | 5 |
| | | | | | | | | 6 |

Table 2: Dispatch Call Interrupt ForDispatch Call Message Type

| Bit Number | | | | | | | | Octet Number |
|---|---|---|---|---|---|---|---|---|
| 8 | 7 | 6 | 5 | 4 | 3 | 2 | 1 | |
| 0 | 1 | 0 | 1 | 1 | 1 | 1 | 0 | 1 |

*FIG. 6*

Table 3: Dispatch Call Interrupt for Interconnect Call

| 8 | 7 | 6 | 5 | 4 | 3 | 2 | 1 | Octet Number |
|---|---|---|---|---|---|---|---|---|
| Transaction Identifier | | | Protocol Discriminator | | | | | 1 |
| Message Type | | | | | | | | 2 |
| IEI | | | | | | | | 3 |
| Phone Number | | | | | | | | 4 |
| | | | | | | | | 5 |
| | | | | | | | | 6 |

Table 4: Dispatch Call Interrupt for Interconnect message Type

| 8 | 7 | 6 | 5 | 4 | 3 | 2 | 1 | Octet Number |
|---|---|---|---|---|---|---|---|---|
| 0 | 1 | 0 | 1 | 1 | 1 | 0 | 1 | 1 |

FIG. 7

METHOD AND SYSTEM FOR SERVICE INTEGRATION IN A MULTI-SERVICE COMMUNICATION SYSTEM

CROSS-REFERENCE TO RELATED APPLICATIONS

Not applicable

FIELD OF THE INVENTION

This invention relates generally to communication systems, and more particularly to a method and system for integrated communication services among disparate networks or services.

BACKGROUND OF THE INVENTION

Several wireless communication systems offer multiple services or features that are not fully integrated in the sense that communication in a first mode can easily and seamlessly be interrupted for requests for communication in a second mode. In one well known existing system offering interconnect (or cellular) communication, dispatch services, and packet data based services all on a single communication system, a user in a dispatch call cannot be interrupted or even notified of another incoming dispatch or interconnect call. Wire-line based telecommunication services have provided comparable integrated services in the form of caller ID and call waiting for many years for generally a single communication mode, namely voice communication. The advent of disparate wireless communication systems converging on a single system or being provided by a single service provider has left an unfulfilled gap in the road to integration and convergence in the wireless services arena. No existing system with multiple disparate communication systems offers a choice to the user whether to take incoming calls or services that are in a different mode or service than their current communication mode. Nor is there an existing system that offers notification of an incoming dispatch call during a dispatch call.

SUMMARY OF THE INVENTION

A method and system of integrating a plurality of communication services can enable a user to be notified and either accept or reject communication services in a current mode or a different mode than their current mode from a third party. For example, a user can be notified and accept or reject a third party dispatch call request or an interconnect request while in current dispatch call or a current interconnect call. Another example can enable a user to be notified and either accept or reject a third party dispatch call request or interconnect call request while in a packet data session.

In a first embodiment of the present invention, a method of integrating a plurality of wireless communication services can include the steps of receiving at least one request among a dispatch call request, an interconnect call request, and a packet data session request while a communication unit is in an active session with at least one among an existing dispatch call, an existing interconnect call, and an existing packet data session, notifying the communication unit with the at least one request while in the active session, and enabling a selection among a rejection of the at least one request, an acceptance of the at least one request, and a message response to the at least one request. The request can be for a different service than the active session or for a dispatch call request when on an existing dispatch call. The method can further include the step of transmitting the at least one request by a third communication unit while the communication unit is in the active session with a second communication unit. The third communication unit can transmit the at least one request to a base station transceiver and the base station transceiver can transmit the request to the communication unit via the second communication unit. The request can be forwarded by the second communication unit to the communication unit using a random access channel. The step of receiving at least one request among the dispatch call request and the interconnect call request while the communication unit is in the active session with at least one among an existing dispatch call and an existing interconnect call can be done by using Associated Control Procedure signaling messages that are embedded in a traffic channel by performing symbol stealing. The method can further include the step of dropping the active session between the communication unit and the second communication unit upon selecting to accept the at least one request from the third communication unit or alternatively continuing the active session between the communication unit and the second communication unit upon selecting to reject the at least one request from the third communication unit.

In a second embodiment of the present invention, a portable communication unit having a plurality of communication services can include a transceiver and a processor coupled to the transceiver. The processor can be programmed to receive at least one request among a dispatch call request, an interconnect call request, and a packet data session request while the portable communication unit is in an active session with at least one among an existing dispatch call, an existing interconnect call, and an existing packet data session, provide notification of the at least one request while in the active session, and enable a selection among a rejection of the at least one request, an acceptance of the at least one request, and a message response to the at least one request. The portable communication unit can also include a presentation device such as a display or speaker for providing the notification.

In a third embodiment of the present invention, a communication system providing a plurality of communication services can include at least one base station transceiver and a plurality of portable communication units in communication with the at least one base station. Each portable communication unit can include a transceiver and a processor coupled to the transceiver. The processor can be programmed to receive at least one request among a dispatch call request, an interconnect call request, and a packet data session request while the portable communication unit is in an active session with at least one among an existing dispatch call, an existing interconnect call, and an existing packet data session, provide notification of the at least one request while in the active session, and enable a selection among a rejection of the at least one request, an acceptance of the at least one request, and a message response to the at least one request. The processor can further be programmed to receive the at least one request by a third communication unit while the portable communication unit is in the active session with a second communication unit. The third communication unit can transmit the at least one request to the at least one base station transceiver and the at least one base station transceiver can transmit the request to the portable communication unit via the second communication unit. The request can be forwarded by the second communication unit to the portable communication unit using a random access channel. The processor can be further programmed to receive at least one request among the dispatch call request and the interconnect call request while the portable communication unit is in the active session with at least one among an existing dispatch call and an existing interconnect call using Associated Control Procedure signaling messages that are embedded in a traffic channel by performing symbol stealing. The processor can be further programmed to drop the active session between the portable communication unit and the second communication unit upon a selection to accept the at least one request from the third communication unit or alternatively the processor can be programmed to continue the active session between the portable communication unit and the second communication unit upon a selection to reject the at least one request from the third communication unit.

DETAILED DESCRIPTION OF THE DRAWINGS

Figure 1:
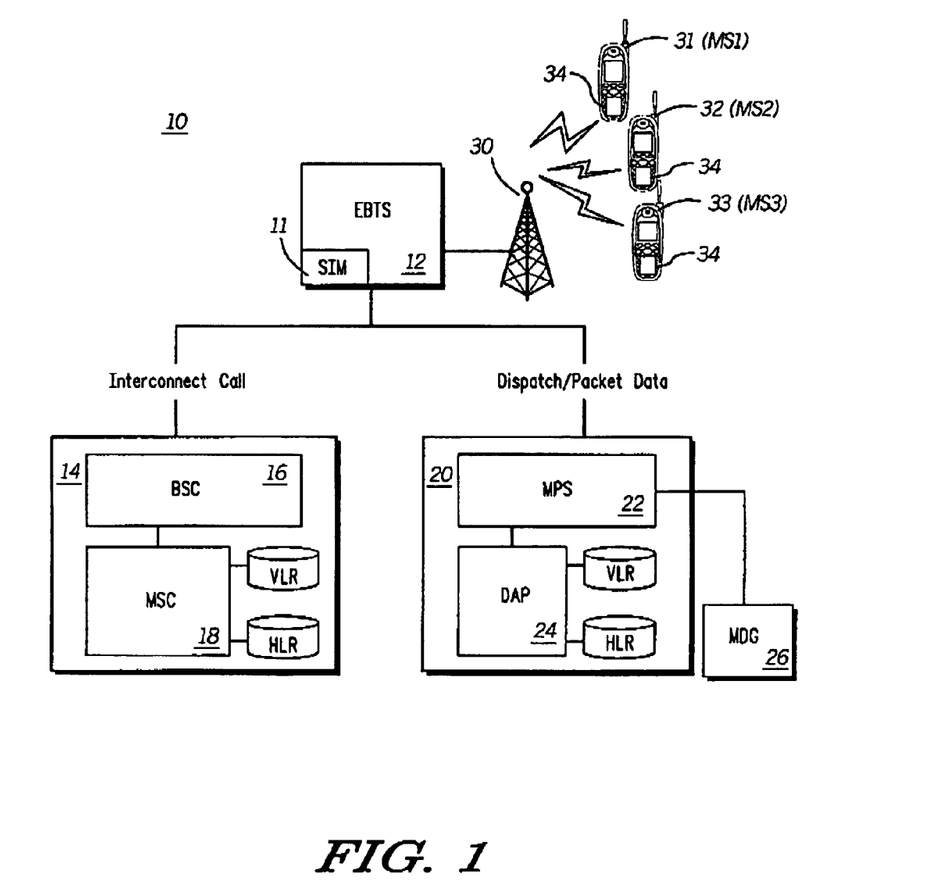
FIG. 1 is a block diagram of a communication system that integrates various communication services in accordance with an embodiment of the present invention.

Referring to FIG. 1, a communication system 10 is shown that can provide several different communication services to a plurality of mobile communication units or mobile stations 31 (MS1), 32 (MS2), and 33 (MS3) in accordance with one embodiment of the present invention. In this instance, the communication system 10 can be an iDEN system network provided by Motorola, Inc. of Schaumburg, Ill. The system 10 can include a variety or hardware and software elements that form the operation components of the system. As shown, some of the basic elements can include an enhanced base transceiver Station (EBTS) 12 coupled to both an interconnect call processing module 14 and a dispatch call processing module 20. Each of the mobile stations 31, 32, and 33 can have a processor 34 programmed to receive communication services from the EBTS 12 and transmit information to the EBTS 12 via an antenna 30. The EBTS 12 can also include a component 11 such as a service integration module (SIM) that can determine the current state of a target mobile station.

The interconnect call processing module 14 can include a base site controller (BSC) 16 coupled to a mobile switching center (MSC) 18 for handling interconnect (cellular) and circuit switched calls. The MSC 18 can be coupled to home location registers (HLR) and visitor location registers (VLR) for providing mobility management as known in the art. The BSC 16 can provide control and concentration functions for one or more EBTS sites and their associated mobile communication units or mobile stations (MS).

The dispatch call processing module 20 can include a metro packet switch (MPS) 22 coupled to a dispatch application processor (DAP) 24 for processing dispatch calls and packet data. The DAP 24 can also be coupled to home location registers (HLR) and visitor location registers (VLR) for providing mobility management as known in the art. In the case of packet data, the MPS 22 can route such packet data via a mobile data gateway (MDG) 26 and onto the Internet or an intranet as desired.

Figure 2:
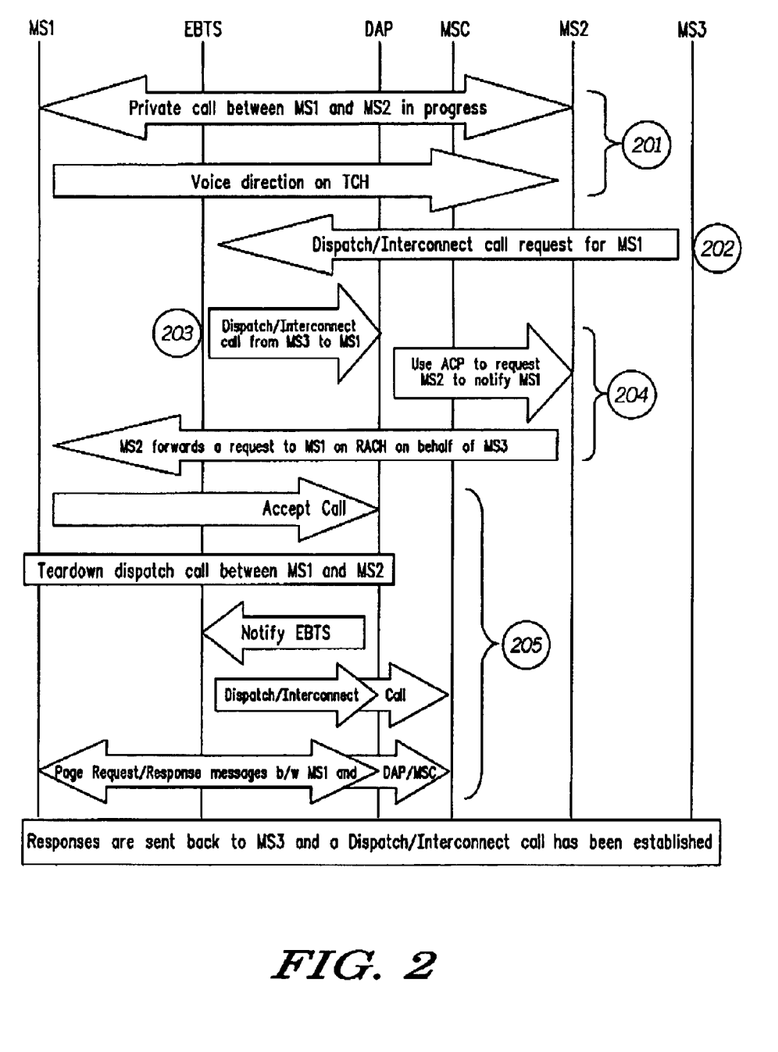
FIG. 2 is a call flow for interconnect (or dispatch) call notification during an existing active dispatch in accordance with an embodiment of the present invention.

Referring to FIG. 2, a call flow 200 for dispatch or interconnect call notification during an existing dispatch call is shown. Further referring to both FIGS. 1 and 2, for dispatch service integration in accordance with an embodiment of the present invention, a third party (MS3) can interrupt an active dispatch call. In this instance, two parties, caller (MS1) and callee (MS2) are in the middle of a dispatch call and the third party (MS3) wants to make an interconnect or dispatch call with MS1 or MS2. The EBTS 12 decides the routing of a call to either the DAP 24 in the case of a dispatch call or the MSC 18 in the case of an interconnect call. Here, the SIM at the EBTS decides on the basis of current status of a MS. If a called MS is in a dispatch call, then the EBTS can route the interconnect call to the DAP. The DAP can then notify a called MS of an incoming call. The callee MS2 can be notified directly but the caller MS1 can be notified via MS2.

If the incoming call is an interconnect call, the EBTS doesn't necessarily route a call to MSC but can send an incoming call notification to MS1 via the DAP with an option to accept or reject a call and waits for a response from MS1. If MS1 responds with yes to accept the call, then the DAP tears down the (dispatch) call between MS1 and MS2 and allows the EBTS to route the (interconnect) call to MSC which then sends a page request to MS1. In case of a dispatch call, the call is routed to the DAP and if MS1 is the party that third party MS3 is trying to reach has a push-to-talk (PTT) button pushed, a fixed network equipment (FNE) portion of the system 10 sends an Associated Control Procedure (ACP) request to MS2 on an Associated Control Channel (ACCH) to Forward a message to MS1. With respect to ACP Messaging, a framework currently exists in Motorola's iDEN infrastructure or FNE equipment for adding new ACP messages on a traffic channel. The maximum packet size can be programmable and can be set at 30 bytes for example. ACP messages are either reliable or non-reliable. For reliable messages, a subscriber receives an acknowledgement or a negative acknowledgment (ACK or NACK) from the DAP. A new ACP message op-code can be added to existing ACP messages as DISPATCH_CALL_WAITING and such a delivery mechanism can also exist in the mobile stations. The FNE sends a PC Page Request to MS2 for MS1. Depending on the response from MS1, the FNE sends either a Call Grant or Call Complete signal (with a Reject Request (RR) causing a user is busy indication) to MS3. In case of rejecting the new request, MS1 does not send anything and based on timer threshold, the FNE sends the Call complete automatically. The bandwidth for the ACCH is obtained by stealing symbols from the traffic channel (TCH). The ACCH is embedded in and associated with a TCH. If the MS1 that the third party is trying to reach is listening, then the FNE sends an ACP request to MS1 on the ACCH.

Referring to a more specific example as shown in FIG. 2, at step 201, an ongoing dispatch call can exist between MS1 and MS2. At step 202, while MS1 is talking to MS2, another party (MS3) wants to establish either a dispatch call or an interconnect call with MS1. At step 203, a Service Request is received at the EBTS from MS3. After determining that MS1 is busy in a dispatch call, the SIM (sec item 11 in FIG. 1) at the EBTS doesn't route a cull to the MSC, but sends an incoming call information to the DAP. If MS1 responded in yes to accept the call, then the DAP tears down the call between MS1 and MS2 and allows EBTS to route a call to MSC which then sends a page request to MS1. At step 204 in this example, if the MS1 that the third party MS3 is trying to reach has a PTT pushed, the DAP sends an ACP request to MS2 on the ACCH to forward a message to MS1. The DAP sends a PC Page Request to MS2 for MS1. Depending on the response from MS1, the FNE sends either a Call Grant or Call Complete (with reject response (RR) causing a busy user indication) to MS3. In case of rejecting (or ignoring) the new request, MS1 does not send anything and based on a timer threshold, the DAP sends the Call complete indication (between MS1 and MS2) to the MS3 automatically. The bandwidth for the ACCH is obtained by stealing a symbol from the TCH. The ACCH is embedded in and associated with a TCH.

If the MS1 that the third party is trying to reach is listening, then the DAP sends an ACP request to MS1 on the ACCH. Bandwidth for the ACCH is obtained by stealing a symbol from the TCH. Alternatively, MS2 can forward a message it receives from the FNE to MS1 on behalf of MS3 using a random access cannel (RACH). The RACH uses an Interrupt message to specify a type of Interruption.

Figure 6:
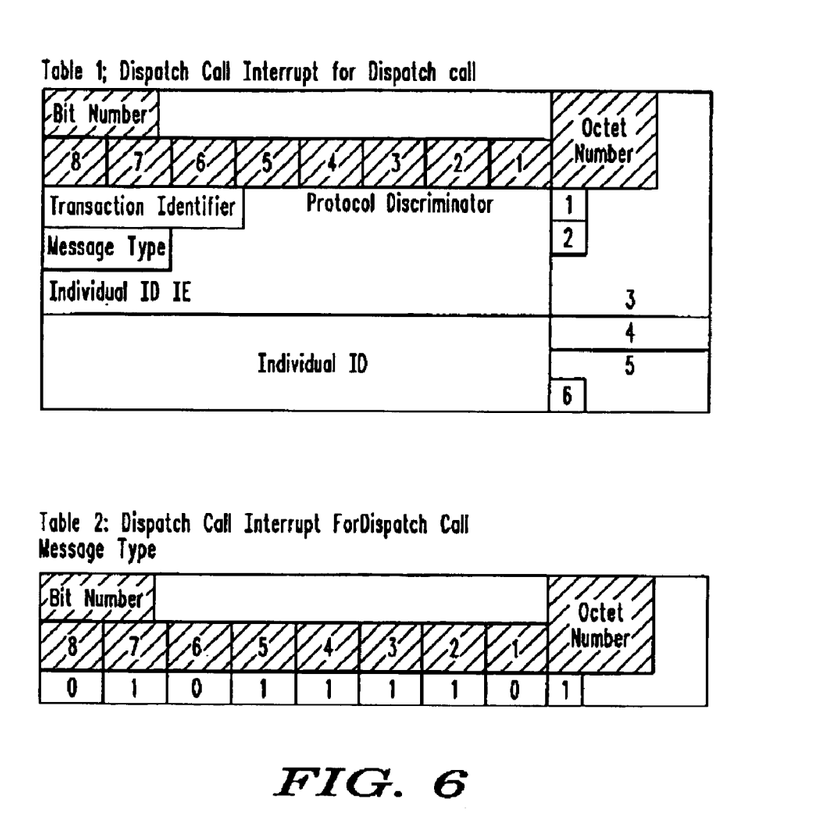
FIG. 6 shows Table 1 and Table 2 for dispatch call interrupt for dispatch calling as referred to in the specification.

For a Dispatch call request, the FNE can send an Interrupt message, as shown in Table 1 of FIG. 6, with a Dispatch ID of the originator (MS3) to MS1 through MS2 if MS1 is transmitting or direct to MS1 if MS1 is listening. The Interrupt message can have an associated Message Type, as shown in Table 2 of FIG. 6, to specify the notification of a dispatch call.

Figure 7:
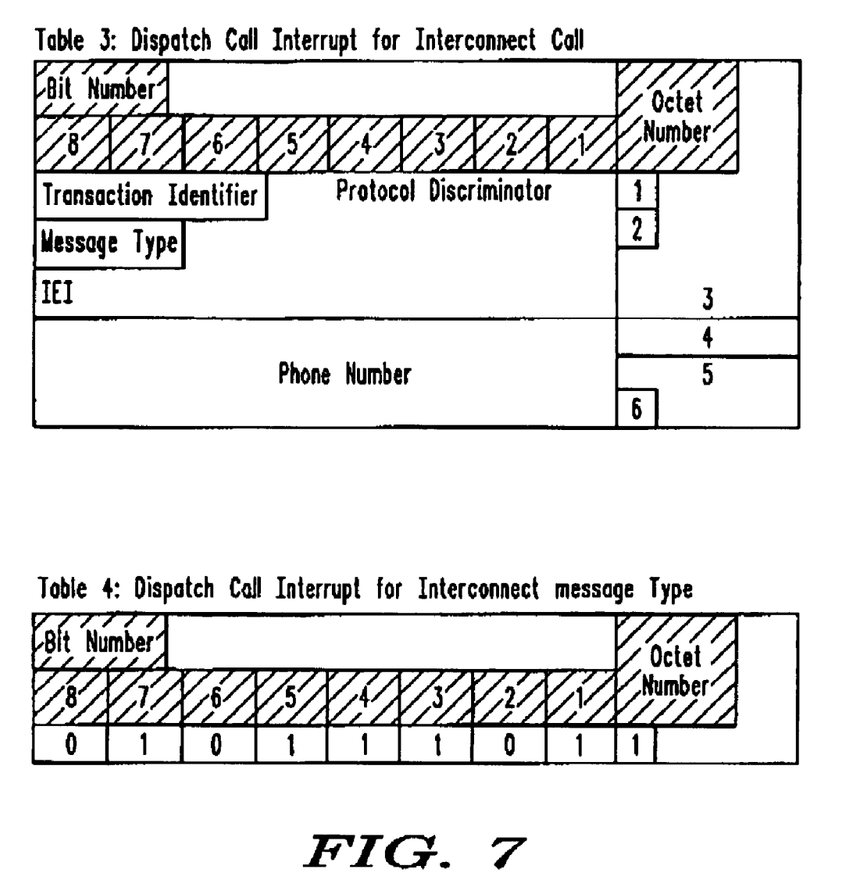
FIG. 7 shows Table 3 and Table 4 for dispatch call interrupt for interconnect calling, as referred Lo in the specification.

In the case of an interconnect call request, the DAP can send essentially the same Interrupt message, as shown in Table 3 of FIG. 7, with a different Message Type, as shown in Table 4 of FIG. 7, to specify the notification of an interconnect call instead.

At step 205, if MS1 responded "yes" to accept the call, then the DAP tears down the call between MS1 and MS2 and allows EBTS to route a call to the MSC which then sends a page request to MS1.

Figure 3:
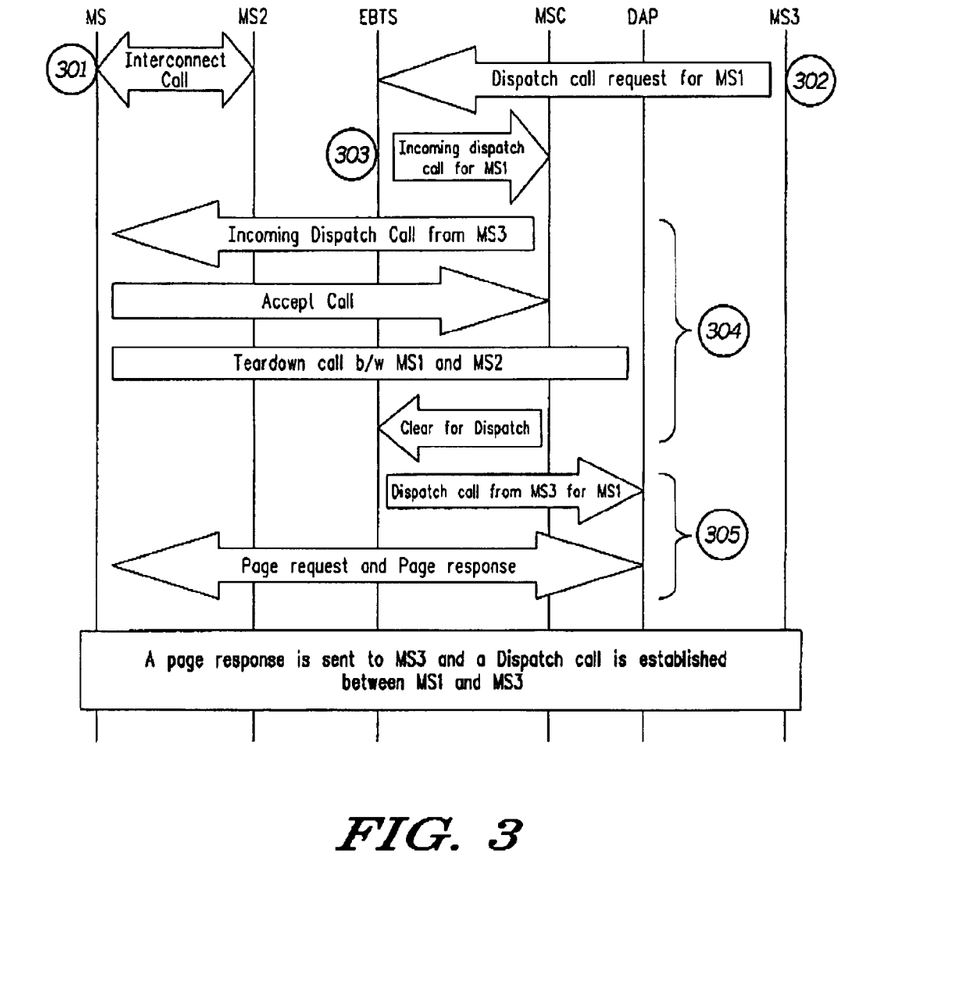
FIG. 3 is a call flow for dispatch call notification during an interconnect call in accordance with another embodiment of the present invention.

Referring to FIG. 3, a call flow 300 for dispatch notification during an existing interconnect call is shown. A dispatch call notification during an interconnect call would allow user to avoid missing important dispatch calls. When a SIM at the EBTS determines that the called MS is on an interconnect call, it doesn't route a request to the DAP and instead notifies the MSC of an incoming dispatch call. MSC can use a call waiting mechanism to inform the called MS of an incoming call. The rejecting dispatch call request does not require any additional message back to FNE (EBTS), it can time out and send a message back to a calling party, but acceptance of the call results in dropping the interconnect call by the MSC and allows the EBTS to route a call to the DAP which then sends a Dispatch call page request to the called MS.

More specifically, at step 301, MS1 can be on an interconnect call with MS2. At step 302, MS3 can send a dispatch call connect request for MS1 to EBTS. At step 303, the SIM at the EBTS (after determining that the called MS is in a interconnect call) sends a request to the MSC. At step 304, the MSC uses a call waiting mechanism to send a dispatch call ID to a called MS. On acceptance by MS1, MSC notifies the SIM at the EBTS. At step 305, the SIM at the EBTS can then route a call to the DAP and the DAP sends a Dispatch call page request to MS1. Upon response from MS1, the DAP sends a response to MS3 and a dispatch call is established.

Figure 4:
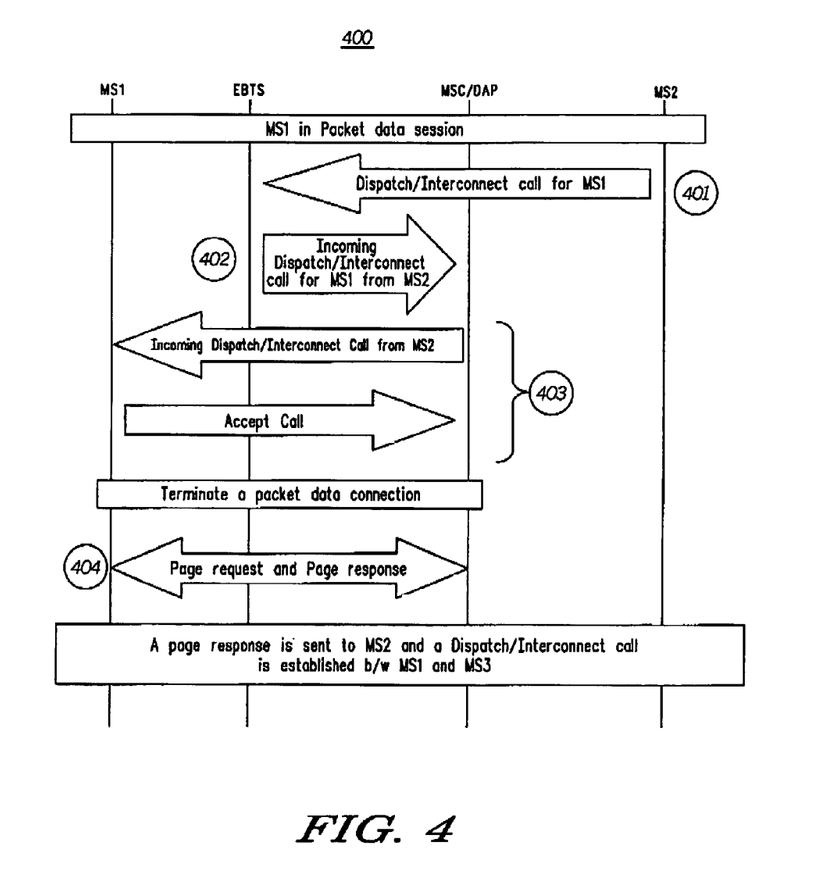
FIG. 4 is a call flow for a dispatch or interconnect call notification during an existing packet data session in accordance with another embodiment of the present invention.

Referring to FIG. 4, a call flow 400 illustrates either dispatch or interconnect notification during a packet data session. A user radio can enter into a "packet data session" when a user receives a grant. A session "hang timer", fixed at 12 seconds in this embodiment, will keep an idle user radio on a packet channel (PCH) in-between either upload or download transmissions. The session hang timer can be reset whenever packets involving that user radio are transferred in either direction. The user radio can return to a primary control channel (PCCH) when the session timer expires.

The operation of the packet channel is very different from that of voice call channels. The packet channel is a shared channel for all users, rather than a specific set of slots set aside for an individual. Due to the channel being assigned various slot patterns, the users are often able to use contiguous slots (using Dynamic Channel Allocation Protocol). Packet channel communications also results in a need for the mobile subscriber (MS) to be made aware of the current channel slot allocations. Packet channel communications also benefits from allocation procedures that enable users to know whose turn it is to use the packet channel.

Since the channel is shared between users, a message from a third party can be sent to a MS currently busy in data activity. When the EBTS receives a Dispatch or interconnect call request for a handset busy in data, the EBTS can forward a message to the appropriate service, (i.e., either the DAP in the case of dispatch call or the MSC in case of an interconnect call). The MSC or DAP (as the case may be) notifies the MS of a call request. Depending upon a user response, the MS either can terminate a packet data session and accept a call by sending a page response or rejects a call.

Referring once again to FIG. 4, step 401 illustrates MS1 busy in packet data activity. MS2 can then send a Dispatch/interconnect call request to the EBTS. At step 402, the SIM at the EBTS can then determine that the called handset is busy in data. The EBTS informs DAP/MSC to send a request to MS1. At step 403, the DAP/MSC sends a request to MS1. MS1 displays the message on screen to notify the user of a dispatch or an interconnect call request. On acceptance of a request, the handset (MS) tears down a packet data connection. At step 404, MS1 can send a page response to DAP/MSC and according to the response from MS1, the DAP/MSC can send a call response to MS2 and establish a call.

Figure 5:
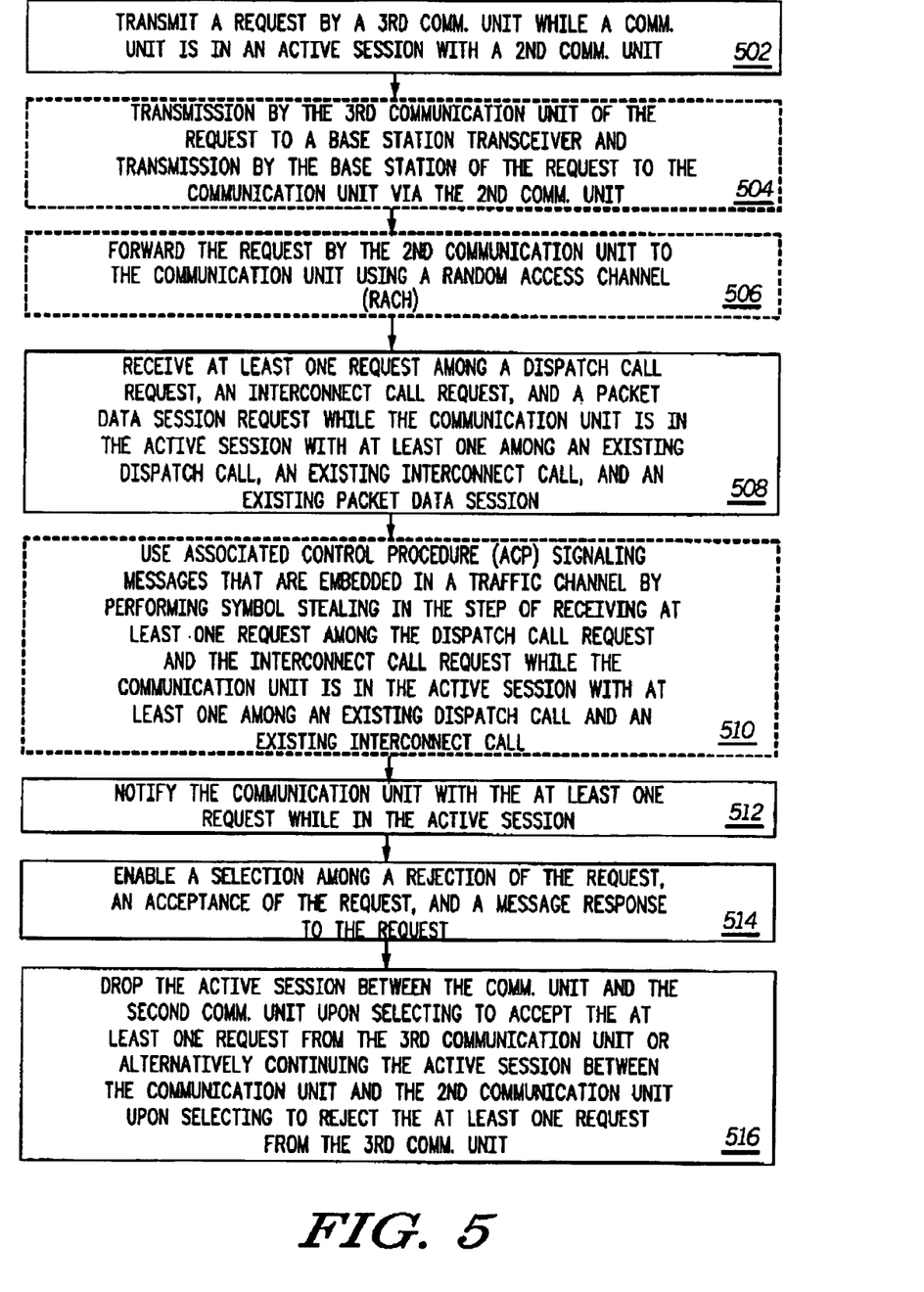
FIG. 5 is a flow chart of a method of service integration in accordance with an embodiment of the present invention.

Referring to FIG. 5, a flow chart illustrating a method 500 of integrating a plurality of wireless communication services is shown. The method 500 can include the step of transmitting a request by a third communication unit while a (first) communication unit is in an active session with a second communication unit. Optionally, the third communication unit can transmit the request to a base station transceiver and the base station transceiver can transmit the request to the (first) communication unit via the second communication unit at step 504. In one embodiment, the second communication unit can forward the request to the (first) communication unit using a random access channel (RACH) at optional step 506, although the present invention is certainly not limited to such option. At step 508, while the communication unit is in an active session with at least one among an existing dispatch call, an existing interconnect call, and an existing packet data session, the communication unit can receive at least one request among a dispatch call request, an interconnect call request, and a packet data session request.

At optional step 510, Associated Control Procedure (ACP) signaling messages that are embedded in a traffic channel by performing symbol stealing are used in the step of receiving at least one request among the dispatch call request and the interconnect call request while the communication unit is in the active session with at least one among an existing dispatch call and an existing interconnect call (a portion of step 508). Next, at step 512, the communication unit is notified with the at least one request while in the active session and at step 514, the communication unit is enabled to select among a rejection of the request (by either merely ignoring the request or actively responding to the request), an acceptance of the request, and a message response to the request. At step 516, the communication system can drop the active session between the communication unit and the second communication unit upon selecting to accept the at least one request from the third communication unit or alternatively continue the active session between the communication unit and the second communication unit upon selecting to reject the at least one request from the third communication unit.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

Additionally, the description above is intended by way of example only and is not intended to limit the present invention in any way, except as set forth in the following claims. For example, the concepts disclosed and claimed herein are contemplated for use with other communication systems having various services such as push-to-talk over cellular (PoC) or systems having messaging and cellular. The variety of services that can be integrated are not limited to those disclosed herein.

What is claimed is:

1. A method of integrating a plurality of wireless communication services, comprising the steps of:
    receiving at least one request for a service among a dispatch call request, an interconnect call request, and a packet data session request while a communication unit is in an active session with at least one among an existing dispatch call, an existing interconnect call, and an existing packet data session, wherein the at least one request is for a different service than the active session or for a dispatch call request when on an existing dispatch call;
    notifying the communication unit with the at least one request while in the active session; and
    enabling a selection among a rejection of the at least one request, an acceptance of the at least one request, and a message response to the at least one request.

2. The method of claim 1, wherein the method further comprises the step of transmitting the at least one request by a third communication unit while the communication unit is in the active session with a second communication unit.

3. The method of claim 2, wherein the third communication unit transmits the at least one request to a base station transceiver and the base station transceiver transmits the request to the communication unit via the second communication unit.

4. The method of claim 3, wherein the at least one request is forwarded by the second communication unit to the communication unit using a random access channel.

5. The method of claim 3, wherein the method further comprises the step of dropping the active session between the communication unit and the second communication unit upon selecting to accept the at least one request from the third communication unit.

6. The method of claim 3, wherein the method further comprises the step of continuing the active session between the communication unit and the second communication unit upon selecting to reject the at least one request from the third communication unit.

7. The method of claim 1, wherein the step of receiving at least one request among the dispatch call request and the interconnect call request while the communication unit is in the active session with at least one among an existing dispatch call and an existing interconnect call is done by using Associated Control Procedure signaling messages that are embedded in a traffic channel by performing symbol stealing.

8. A portable communication unit having a plurality of communication services, comprising:
    a transceiver; and
    a processor coupled to the transceiver, wherein the processor is programmed to:
        receive at least one request among a dispatch call request, an interconnect call request, and a packet data session request while the portable communication unit is in an active session with at least one among an existing dispatch call, an existing interconnect call, and an existing packet data session;
        provide notification of the at least one request while in the active session; and
        enable a selection among a rejection of the at least one request, an acceptance of the at least one request, and a message response to the at least one request.

9. The portable communication unit of claim 8, wherein the unit further comprises a presentation device for providing the notification selected among the group comprising a display and a speaker.

10. A communication system providing a plurality of communication services, comprising:
    at least one base station transceiver;
    a plurality of portable communication units in communication with the at least one base station, wherein each portable communication unit comprises:
    a transceiver; and
    a processor coupled to the transceiver, wherein the processor is programmed to:
        receive at least one request among a dispatch call request, an interconnect call request, and a packet data session request while the portable communication unit is in an active session with at least one among an existing dispatch call, an existing interconnect call, and an existing packet data session;
        provide notification of the at least one request while in the active session; and
        enable a selection among a rejection of the at least one request, an acceptance of the at least one request, and a message response to the at least one request.

11. The communication system of claim 10, wherein the processor is further programmed to receive the at least one request by a third communication unit while the portable communication unit is in the active session with a second communication unit.

12. The communication system of claim 11, wherein the third communication unit transmits the at least one request to the at least one base station transceiver and the at least one base station transceiver transmits the request to the portable communication unit via the second communication unit.

13. The communication system of claim 12, wherein the at least one request is forwarded by the second communication unit to the portable communication unit using a random access channel.

14. The communication system of claim 12, wherein the processor is further programmed to drop the active session between the portable communication unit and the second communication unit upon a selection to accept the at least one request from the third communication unit.

15. The communication system of claim 12, wherein the processor is further programmed to continue the active session between the portable communication unit and the second communication unit upon a selection to reject the at least one request from the third communication unit.

16. The communication system of claim 10, wherein the processor is further programmed to receive at least one request among the dispatch call request and the interconnect call request while the portable communication unit is in the active session with at least one among an existing dispatch call and an existing interconnect call using Associated Control Procedure signaling messages that are embedded in a traffic channel by performing symbol stealing.

* * * * *